(12) United States Patent
Sato et al.

(10) Patent No.: US 10,693,325 B2
(45) Date of Patent: Jun. 23, 2020

(54) CONTACTLESS POWER TRANSFER APPARATUS

(71) Applicant: HOSIDEN CORPORATION, Osaka (JP)

(72) Inventors: Eiji Sato, Osaka (JP); Hiroshi Ema, Osaka (JP)

(73) Assignee: Hosiden Corporation, Osaka (JP)

( * ) Notice: Subject to any disclaimer, the term of this patent is extended or adjusted under 35 U.S.C. 154(b) by 265 days.

(21) Appl. No.: 15/841,638

(22) Filed: Dec. 14, 2017

(65) Prior Publication Data

US 2018/0219424 A1 Aug. 2, 2018

(30) Foreign Application Priority Data

Jan. 31, 2017 (JP) ................................. 2017-015073

(51) Int. Cl.
*H02J 50/12* (2016.01)
*H01F 38/14* (2006.01)
*H02J 7/02* (2016.01)
*H02M 1/32* (2007.01)
*H02H 9/04* (2006.01)

(52) U.S. Cl.
CPC ............. *H02J 50/12* (2016.02); *H01F 38/14* (2013.01); *H02H 9/04* (2013.01); *H02J 7/025* (2013.01); *H02M 1/32* (2013.01)

(58) Field of Classification Search
CPC ........... H02J 50/12; H02J 7/025; H01F 38/14; H02H 9/04; H02M 1/32
See application file for complete search history.

(56) References Cited

U.S. PATENT DOCUMENTS

| 2011/0267730 | A1* | 11/2011 | Brand | H02H 9/042 361/91.2 |
| 2013/0043951 | A1* | 2/2013 | Irish | H03F 1/523 330/285 |
| 2018/0108461 | A1* | 4/2018 | Rostron | G01J 5/0096 |

FOREIGN PATENT DOCUMENTS

| JP | S55-33606 | 8/1980 |
| JP | 2013-115908 A | 6/2013 |

OTHER PUBLICATIONS

Dai et al., "A Wireless Power Transfer System based on Class E Amplifier," ICCAS, IEEE, Oct. 20, 2013, pp. 427-430. (Year: 2013).*
Clark, "Transient Voltage Suppressor Types and Applications," PCIM vol. 16, No. 11, Nov. 1990, pp. 19 and : 121-26. (Year: 1990).*
Pal et al., "Comparative Study of Enhancement-Mode Gallium Nitride FETs and Silicon MOSFETs for Power : Electronic Applications," NCPE, IEEE, Dec. 2014, pp. 1-6 (Year: 2014).*
(Continued)

*Primary Examiner* — Jared Fureman
*Assistant Examiner* — Michael J Warmflash
(74) *Attorney, Agent, or Firm* — Dilworth & Barrese, LLP

(57) ABSTRACT

A contactless power transfer apparatus includes an E-class amplifier having a coil configured to store an amount of energy for use in contactless power transfer and a field-effect transistor for controlling a current that flows in the coil, and an arrester provided between a drain terminal and a source terminal of the field-effect transistor and configured to be operated in response to application of a voltage having a voltage value lower than an absolute maximum rated voltage value between the drain and the source of the field-effect transistor.

8 Claims, 1 Drawing Sheet

(56) References Cited

OTHER PUBLICATIONS

Dai et al., "A Wireless Power Transfer System based on Class E Amplifier," ICCAS, IEEE, Oct. 20, 2013, pp. 427-430.
Clark, "Transient Voltage Suppressor Types and Applications," PCIM vol. 16, No. 11, Nov. 1990, pp. 19 and 21-26.
Pal et al., "Comparative Study of Enhancement-Mode Gallium Nitride FETs and Silicon MOSFETs for Power Electronic Applications," IICPE, IEEE, Dec. 8, 2014. pp. 1-6.
European Search Report dated Apr. 24, 2018.

\* cited by examiner

CONTACTLESS POWER TRANSFER APPARATUS

CROSS REFERENCE TO RELATED APPLICATION

This application is based on and claims priority under 35 U.S.C. Section 119 to Japanese Patent Application No. 2017-015073 filed on Jan. 31, 2017, the entire content of which is incorporated herein by reference.

TECHNICAL FIELD

This disclosure relates to a contactless (wireless) power transfer apparatus in a contactless manner.

RELATED ART

Recently, there has been utilized a contactless power transfer apparatus for charging a storage battery in a contactless manner. One example of such technique is known from e.g. JP2013-115908A.

A power source device of a contactless power transfer apparatus disclosed in JP2013-115908A includes a DC power source and an amplifier having a switching device connected to the DC power source. The amplifier includes a protection device which can be parallel-connected to the switching device via a switching means.

According to the power source device of this contactless power transfer apparatus, prior to power supply to a system on the mobile side, an operation for bringing a resonant system of the power feeding side (primary side) and a resonant system of the power receiving side (secondary side) into an appropriate resonance state, namely, matching of an input impedance of the resonance system and an output impedance of a high-frequency power source, is effected. The switching means is configured such that at the time of the above-described matching, the protection device is switched to be parallel-connected to the switching device in order to prevent impingement of an excess voltage to the switching device, whereas after the matching, the parallel-connection of the protection device to the switching device is released. Also, as the protection device, a zener diode is employed.

SUMMARY

Like the technique disclosed in JP2013-115908A, for a magnetic field resonance type contactless power transfer, an E-class amplifier is often employed for its high power transfer efficiency. According to such E-class amplifier, energy is stored in a coil provided in a path and discharge of the energy stored in the coil is controlled by the switching device, thus effecting switching with high efficiency. However, if the resonance condition changes due to e.g. presence/absence of a coil on the power receiving side, this may result in impingement of a voltage as nearly high as six times of the rated voltage, so that the devices constituting this E-class amplifier may be damaged. For this reason, it is necessary to employ a protection device (a zener diode in JP2013-115908A) having high voltage resistance, which is a factor inviting cost increase. Further, as the protection device, e.g. a barrister can also be employed. However, since the barrister has a large parasitic capacitance, the resonant condition can be affected thereby. Moreover, such zener diode or the barrister may be damaged in a short-circuited state when impinged with an excess voltage (damage in a short-circuit mode), so it cannot be said that they can provide device protection in a reliable manner.

Embodiments of the present invention comprise a contactless power transfer apparatus that can protect devices in a reliable manner at low costs.

A contactless power transfer apparatus according to this disclosure comprises:

an E-class amplifier having a coil configured to store an amount of energy for use in contactless power transfer and a field-effect transistor for controlling a current that flows in the coil; and an arrester provided between a drain terminal and a source terminal of the field-effect transistor and configured to be operated in response to application of a voltage having a voltage value lower than an absolute maximum rated voltage value between the drain and the source of the field-effect transistor.

In this case, in place of e.g. a detection circuit for detecting an excess voltage to be applied to the contactless power transfer apparatus, an arrestor is included in the contactless power transfer apparatus. This allows reliable protection of the devices included in the contactless power transfer apparatus at low cost. Further, such arrestor is not damaged neither by a momentary rush current, nor by a large current that flows continuously. Moreover, although the arrestor will not be damaged when impinged with a high voltage, if it should be damaged, the resultant failure will occur in an open mode, so that abnormal short-circuit can be prevented. Also, at the time of abnormal operation, the arrestor can signify the abnormality to the surrounding through illumination thereof.

Further, according to one embodiment of the contactless power transfer apparatus, the arrestor comprises a gas arrestor containing inactive gas within a container.

Since the parasitic capacitance of such gas arrestor is small, its effect to the resonance optimized for the contactless power transfer can be minimized, in the case of the above arrangement.

According to a further embodiment of the contactless power transfer apparatus, the field-effect transistor is fabricated with using gallium nitride.

In this case, the field-effect transistor can be formed compact. Therefore, the contactless power transfer apparatus as a whole too can be formed compact.

According to a still further embodiment of the contactless power transfer apparatus, the apparatus further comprises:

a light detection section for detecting light emitted from the arrestor at the time of operation of this arrestor; and a reporting section for reporting an operation of the arrestor when the light detection section detects an operation of the arrestor.

In this case, abnormality in the contactless power transfer apparatus can be visually grasped by and can be reported to a user even from the outside of the contactless power transfer apparatus.

DESCRIPTION OF EMBODIMENTS

A contactless power transfer apparatus relating to this disclosure has a function of protecting its constituent devices at low cost and in a reliable manner. Next, a contactless power transfer apparatus 1 according to this embodiment will be explained.

Figure 1:
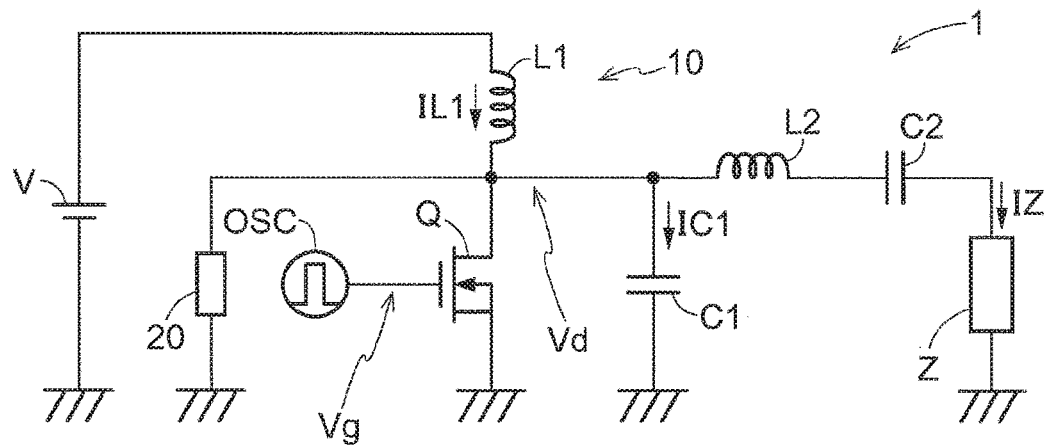
FIG. 1 is a block diagram schematically showing a configuration of a contactless power transfer apparatus.

FIG. 1 is a block diagram schematically showing a configuration of the contactless power transfer apparatus 1. As shown in FIG. 1, the contactless power transfer apparatus 1 includes an E-class amplifier 10 and an arrestor 20. The E-class amplifier 10 includes an input power source V, an oscillator OSC, a primary coil L1, a secondary coil L2, a field-effect transistor Q, a first capacitor C1, a second capacitor C2, and a coil Z.

In the contactless power transfer apparatus 1, the positive electrode of the input power source V and one terminal of the primary coil L1 are connected to each other and the other terminal of the primary coil L1 and the drain terminal of the field-effect transistor Q are connected to each other. The source terminal of the field-effect transistor is grounded. And, the first capacitor C1 is provided between the drain terminal of the field-effect transistor Q and the GND.

Further, the drain terminal of the field-effect transistor Q and one terminal of the secondary coil L2 are connected to each other and the other terminal of the secondary coil L2 and one terminal of the second capacitor C2 are connected to each other. The other terminal of the second capacitor C2 is connected to the coil Z. To the gate terminal of the field-effect transistor Q, oscillation signals from the oscillator OSC are inputted. The field-effect transistor Q is driven based on the oscillation signals inputted to its gate terminal and thereby controls the current that flows in the coil Z.

The E-class amplifier 10, as being connected as described above, oscillates the secondary coil L2 and the second capacitor C2 which are serially connected to each other and stores an amount of energy for contactless power transfer within the coil Z.

Figure 2:
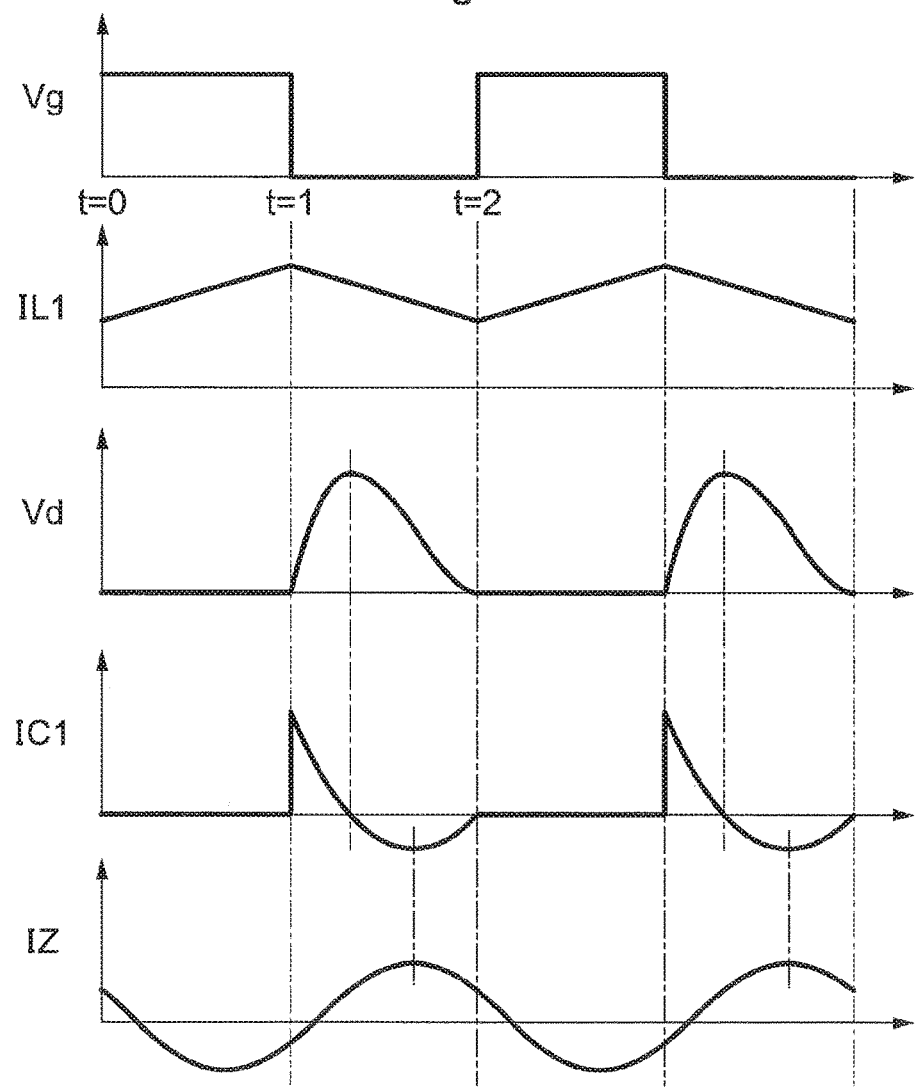
FIG. 2 is a graph showing waveforms of respective sections.

FIG. 2 shows, in the order from the top to the bottom, a waveform of a voltage Vg of the gate terminal of the field-effect transistor Q, a waveform of a current IL1 that flows in the primary coil L1, a waveform of a voltage Vd of the drain terminal of the field-effect transistor Q, a waveform of a current IC1 that flows in the first capacitor C1 and a waveform of a current IZ that flows in the coil Z. When the field-effect transistor Q is turned ON in response to input of an H(high) signal to its gate terminal (t=0), the current IL1 flowing in the primary coil L1 increases, when the voltage Vd of the drain terminal of the field-effect transistor Q becomes a zero voltage. When the field-effect transistor Q is turned OFF (t=1), the current IL1 flowing in the primary coil L1 decreases, when the first capacitor C1 is charged with the current IC1. With this, the voltage Vd of the drain terminal of the field-effect transistor Q increases progressively.

In case the load of the contactless power transfer apparatus 1 is optimized, the voltage Vd of the drain terminal of the field-effect transistor Q will decrease progressively and when it becomes zero voltage, the field-effect transistor Q is turned ON (t=2). With such turn ON/OFF actions of the field-effect transistor Q, pulsate voltages are applied to the secondary coil L2 and the second capacitor C2, whereby an alternating current flows in the coil Z.

Referring back to FIG. 1, between the drain terminal and the source terminal of the field-effect transistor Q, the arrestor 20 is provided. Therefore, this arrestor 20 is connected parallel with the first capacitor C1. The arrestor 20 employed is configured to function in response to input thereto of a voltage having a value lower than the absolute maximum rated voltage between the drain-source of the field-effect transistor Q. Therefore, even when a voltage having a voltage value equal to or greater than the absolute maximum rated voltage between the drain-source of the field-effect transistor Q is applied to the drain terminal of the field-effect transistor Q, as the arrestor 20 short-circuits between the drain and the source of the field-effect transistor Q, this field-effect transistor Q can be protected. With this, reliable and low-cost protection of the devices constituting the contactless power transfer apparatus 1 is made possible.

Preferably, the arrestor 20 is configured as a gas arrestor having inactive gas charged and filled in a container such as a glass pipe. Such gas arrestor, when fails, fails in an open mode. So, even if the arrestor 20 fails, this arrestor 20 can still prevent short-circuit between the other terminal of the primary coil L1 and the GND.

Also, preferably, the field-effect transistor Q is fabricated with using gallium nitride. By the fabrication using gallium nitride, it is possible to increase the absolute maximum rated voltage between the drain-source of the field-effect transistor Q, so that the possibility of damage of the field-effect transistor Q can be lessened. Further, by the fabrication using gallium nitride, compactization is made possible also.

Other Embodiments

In the foregoing embodiment, it was explained that the arrestor 20 comprises a gas arrestor having inactive gas charged and filled in a container such as a glass pipe. However, it is also possible to employ a micro-gap arrestor, or a chip-type arrestor.

In the foregoing embodiment, it was explained that the field-effect transistor Q is fabricated with using gallium nitride. However, the field-effect transistor Q may be fabricated with using other semiconductor (e.g. silicon, silicon carbide, etc.).

In the foregoing embodiment, there was explained an example for use in contactless power transfer. However, application of the invention is not limited to the magnetic field resonance contactless power transfer, but also to field coupling type contactless power transfer or to a high output wireless transmission apparatus or even to protection of an inverter.

Here, preferably, the contactless power transfer device 1 includes a light detection section for detecting light emitted from the arrestor 20 when this arrestor 20 is operated and a reporting section for reporting operation of the arrestor 20. With this arrangement, abnormality in the contactless power transfer apparatus 1 can be visually grasped by and can be reported to a user even from the outside of the contactless power transfer apparatus 1.

This disclosure is applicable to a contactless power transfer apparatus that transfers (feeds) power in a contactless (wireless) manner.

The invention claimed is:
1. A contactless power transfer apparatus comprising:
an E-class amplifier having a coil configured to store an amount of energy for use in contactless power transfer and a field-effect transistor for controlling a current that flows in the coil;
   an arrester provided between a drain terminal and a source terminal of the field-effect transistor and configured to be operated in response to application of a voltage having a voltage value lower than an absolute maximum rated voltage value between the drain and the source of the field-effect transistor; and
   a light detection section for detecting light emitted from the arrestor at the time of operation of this arrestor.

2. The contactless power transfer apparatus of claim 1, wherein the arrestor comprises a gas arrestor containing inactive gas within a container.

3. The contactless power transfer apparatus of claim 2, wherein the field-effect transistor is fabricated with using gallium nitride.

4. The contactless power transfer apparatus of claim 3, further comprising:
   a reporting section for reporting an operation of the arrestor when the light detection section detects an operation of the arrestor.

5. The contactless power transfer apparatus of claim 2, further comprising:
   a reporting section for reporting an operation of the arrestor when the light detection section detects an operation of the arrestor.

6. The contactless power transfer apparatus of claim 1, wherein the field-effect transistor is fabricated with using gallium nitride.

7. The contactless power transfer apparatus of claim 3, further comprising:
   a reporting section for reporting an operation of the arrestor when the light detection section detects an operation of the arrestor.

8. The contactless power transfer apparatus of claim 1, further comprising:
   a reporting section for reporting an operation of the arrestor when the light detection section detects an operation of the arrestor.

* * * * *